UNITED STATES PATENT OFFICE.

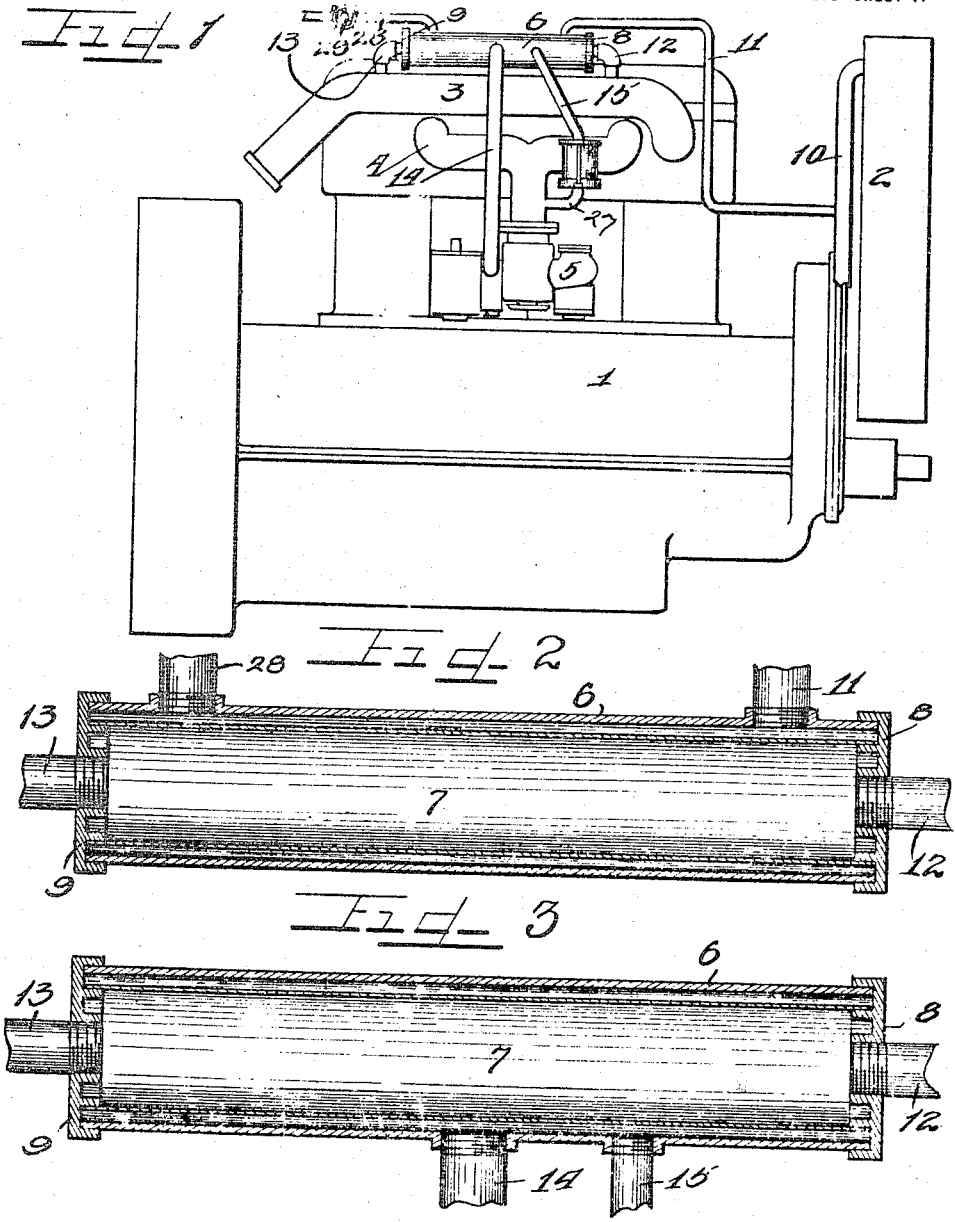

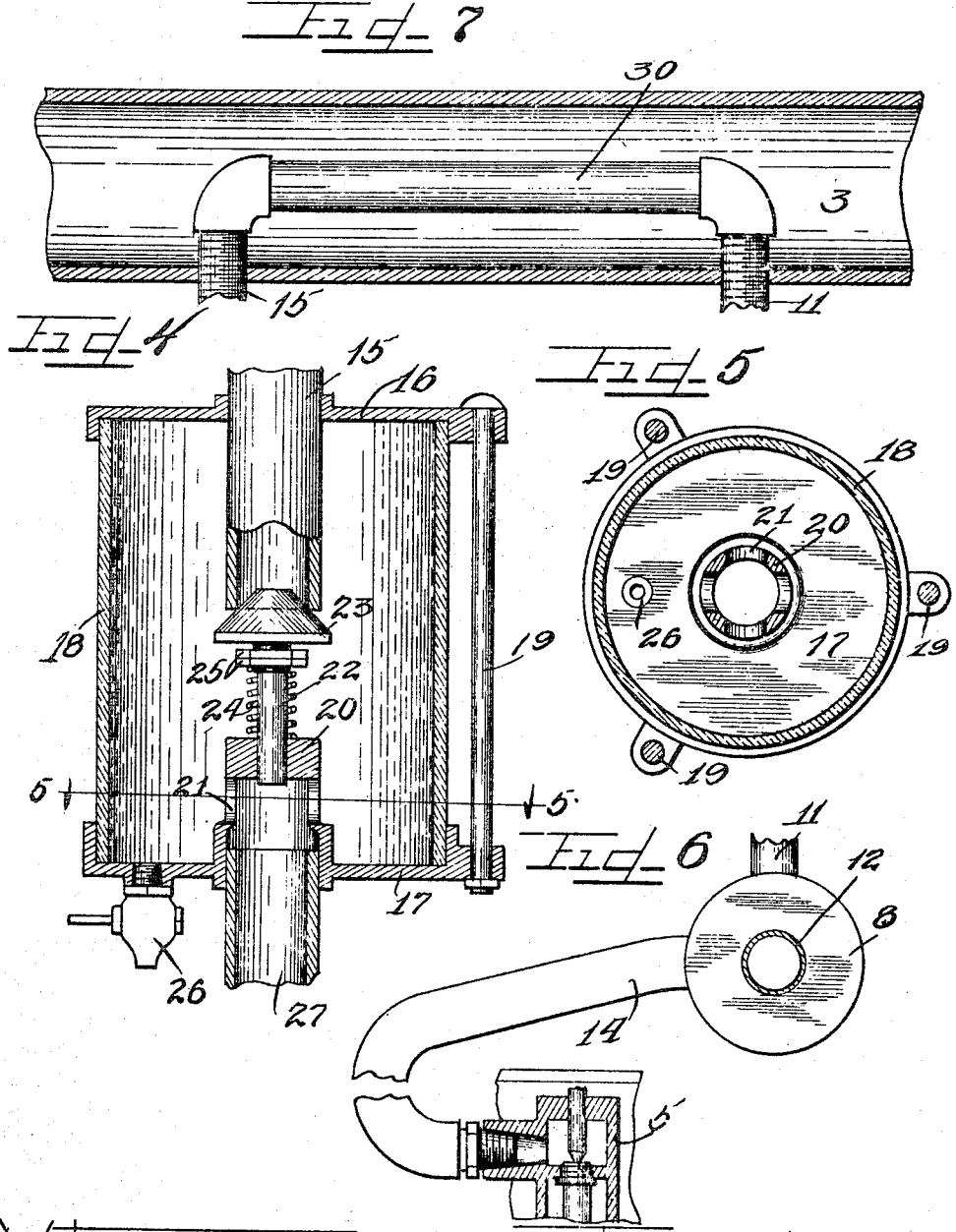

WILFRED D. FLEAK AND ARTHUR W. GENTRY, OF CHICAGO, ILLINOIS.

AUXILIARY HOT-AIR AND MOISTURE DEVICE.

1,278,900.  Specification of Letters Patent.  Patented Sept. 17, 1918.

Application filed December 29, 1916. Serial No. 139,488.

*To all whom it may concern:*

Be it known that we, WILFRED D. FLEAK and ARTHUR W. GENTRY, citizens of the United States, and residents of the city of Chicago, in the county of Cook and State of Illinois, have invented certain new and useful Improvements in Auxiliary Hot-Air and Moisture Devices; and we do hereby declare that the following is a full, clear, and exact description of the same, reference being had to the accompanying drawings, and to the numerals of reference marked thereon, which form a part of this specification.

This invention relates to an auxiliary attachment for an internal combustion engine whereby water vapor in a preheated condition may be introduced into the manifold of the engine through which the inlet mixture for combustion is flowing. The beneficial effects of the introduction of water vapor into an engine have been demonstrated, and it has been shown that the carbon deposit is greatly reduced, and a much better running motor results.

It is an object therefore of this invention to construct a vapor system for introduction of water vapor into the fuel inlet mixture of an engine.

It is also an object of this invention to construct heating elements for a water vapor system comprising an annular heating space, and with an outlet pipe leading therefrom through a glass sight chamber, in which suitable valve mechanisms are mounted operating automatically to admit water vapor from the heating elements into the manifold of the engine with which said glass chamber is connected due to the suction effect exerted through said glass chamber by the conditions within the manifold of the engine.

It is also an object of this invention to construct a water vapor system for use with an engine wherein a heating element is associated with the exhaust manifold of the engine, and a sight glass chamber provided with valve means is provided to receive water vapor drawn from the heating element thereinto to permit transfer thereof to the intake manifold of the engine, the transfer of the water vapor being accomplished by the suction draft within the intake manifold of the engine exerted through the glass sight chamber and the heating element.

It is furthermore an important object of this invention to construct a water vapor system for use in combination with an internal combustion engine wherein the water vapor obtained from the water circulating system of the engine is transferred to a heating element wherein vaporization of any water and preheating of the water vapor is assured for introduction through a sight feed chamber provided with valve means for permitting flow of the water vapor through a pipe connection into the intake manifold of the engine due to the suction effect exerted therein.

It is finally an object of this invention to construct an improved form of suction operated water vapor system for use with an internal combustion engine wherein an automatic valve is provided to open the water vapor line due to the suction effect exerted by the intake manifold through the various elements of the water vapor system.

The invention (in a preferred form) is illustrated in the drawings and hereinafter more fully described.

On the drawings:

Figure 1 is a conventional side elevation of an internal combustion motor equipped with a device embodying the principles of our invention.

Fig. 2 is a vertical longitudinal section taken through the heating element shown attached thereon.

Fig. 3 is a similar horizontal section taken therethrough.

Fig. 4 is a vertical central section taken through the sight feed chamber, with parts shown in elevation and parts omitted.

Fig. 5 is a section on line 5—5 of Fig. 4.

Fig. 6 is a fragmentary detail partly in elevation and partly in section, illustrating the connection of an auxiliary vapor line from the heating element direct to the carbureter of the engine.

Fig. 7 is a longitudinal section showing a modified type of heating element connected to the exhaust manifold of the engine.

As shown in the drawings:

The reference numeral 1, indicates as a whole an internal combustion engine of a type generally used on motor cars, and connected therewith is a radiator 2, through which the circulating water of the engine is pumped in the usual manner. The engine is shown provided with an exhaust manifold 3, and an inlet manifold 4, with a carbureter 5, connected to the inlet manifold. Connected upon the exhaust manifold 3, is a stove element comprising an outer cylinder 6 and an inner cylinder 7, and with an end cap 8 and an end cap 9, sealingly connected to the ends of said cylinders maintaining the same in spaced concentric relation. An air or vapor relief pipe, denoted by the reference numeral 10, is shown forming a part of the radiator 2, as is usual in radiator construction, and connected thereinto is a pipe line 11, which communicates through the outer cylinder 6, of the stove element into the annular heating space surrounding the inner cylinder 7. A pipe connection 12, is provided between the end cap 8, and exhaust manifold 3, to permit introduction of the exhaust gases through the inner cylinder 7, and another pipe 13, is connected to the end cap 9, and with the exhaust manifold 3, to permit outlet of the exhaust gases from the inner cylinder member 7.

Communicating through one side of the cylinder 6, of the stove element, is a pipe 14, which leads downwardly and communicates with an inlet aperture of the carbureter 5, as shown in detail in Fig. 6. Another pipe connection 15, communicates through the cylinder member 6, of the stove element and leads downwardly into the upper end of a glass sight feed chamber, comprising a top cap 16, and a bottom cap 17, with a glass cylinder 18, clamped in sealing relation therebetween by bolts 19. Integrally formed on the bottom cap or closure member 17, of the sight feed chamber, is an axially disposed upright cylindrical member 20, having ports 21, formed in the sides thereof. Slidably mounted vertically in the upper end of the member 20, is the stem 22, of a valve 23, adapted to close the lower end of the pipe connection 15, which extends downwardly through the upper cap 16, of the sight feed chamber. A compression spring 24, is coiled about the stem 22, and bears upwardly beneath a pair of adjustable locking nuts 25, to normally thrust the valve 23, into closed relation with the lower end of the pipe 15, and the compression stress on said spring 24, may be varied by changing the adjustment of said nuts 25.

Threaded into an aperture in the bottom cap member 17, is a drain cock 26. An outlet pipe 27, is connected through an aperture in the lower cap member 17, of the sight chamber registering with the cylindrical member 20, formed therein, and leads downwardly and is connected into the intake manifold 4, of the engine 1. Another pipe 28, communicates through the cylinder 6, of the stove element, and is provided with a valve 29, which may be conveniently disposed, to open the pipe line and admit air into the stove element or any other fluid if so desired.

In the modified form of heating element shown in Fig. 7, the heating pipe for the water or water vapor is denoted by the reference numeral 30, and is disposed on the interior of the exhaust manifold 3.

The operation is as follows:

When the engine 1, is in operation, a suction is exerted through the intake manifold 4, and this draft is transferred through the pipe 27, to the sight chamber 18, into which water vapor which has been preheated is drawn through the pipe 15, past the automatic valve 23, which opens due to the suction. Said pipe 15, serves to draw the water vapor from the stove element 6, and the vapor is drawn into the stove element 6, through the pipe 11, which may be connected to any suitable source of water supply, but as shown, is connected to the relief line 10, of the radiator 2. In the event of any water of condensation flowing through the line 15, the same will be collected in the lower end of the sight chamber 18, and may be drawn therefrom by opening the drain cock 26. The spring stress, which serves to retain the valve 23, closed, may be varied by adjustment of the lock nuts 25. The pipe line 14, also serves as a means for introducing the water from the element 6, directly into the carbureter and not into the manifold.

In the modified form of stove element shown in Fig. 7, the inlet pipe 11, for the water vapor is introduced into the hot pipe 30, which is mounted within the exhaust manifold 3, and leaves the hot pipe by the pipe 15, as before.

We are aware that various details of construction may be varied through a wide range without departing from the principles of this invention, and we therefore do not purpose limiting the patent granted otherwise than necessitated by the prior art.

We claim as our invention:

1. In a device of the class described the combination with an engine, its exhaust manifold and intake manifold, of a stove element associated with the exhaust manifold, a pipe leading to said element for admission of water and water vapor thereinto, another pipe leading therefrom for exit of the heated water vapor, a sight chamber to which said latter pipe is connected, an automatic valve in said sight chamber, and a pipe leading from said sight chamber into the intake manifold of the engine.

2. In a device of the class described the combination with an engine, its exhaust manifold and intake manifold, of a stove element associated with the exhaust manifold, means for introducing water and water vapor into the stove element, a sight chamber in communication therewith, valve means within said sight chamber adapted to open automatically under suction draft to admit the water vapor from the stove element, a pipe leading from said sight chamber into the intake manifold of the engine, and means draining water of condensation from said sight chamber.

3. In a device of the class described the combination with an engine and a stove element associated therewith, of a sight chamber in communication with said stove element to receive water vapor therefrom, and valve means mounted within said sight chamber to control the flow of water vapor thereinto, said valve actuated according to suction drafts, exerted through said sight chamber.

4. In a device of the class described the combination with an engine, its exhaust manifold and intake manifold, of a heating member associated with the exhaust manifold, a pipe line leading thereto for introduction of water and water vapor thereinto, an outlet pipe leading from said heating element, a sight chamber into which said outlet is connected, said sight chamber provided with an automatic normally closed valve to limit passage of the heated vapor thereinto from said heating element, and adapted to open under suction transmitted to said sight chamber, and a pipe communicating in said sight chamber and with the inlet manifold of the engine.

5. In a device of the class described, the combination with a heating element, of a pipe leading therefrom, and a sight chamber into which said pipe is connected, an automatic valve mounted within said sight chamber closing the end of said pipe within said sight chamber, and outlet from said sight chamber, a drain cock connected in said sight chamber, and means varying the spring stress on said automatic normally closed valve.

In testimony whereof we have hereunto subscribed our names in the presence of two subscribing witnesses.

WILFRED D. FLEAK.
ARTHUR W. GENTRY.

Witnesses:
   CHARLES W. HILLS, Jr.,
   EARL M. HARDINE.